United States Patent
Hiatt et al.

(10) Patent No.: US 10,019,433 B2
(45) Date of Patent: *Jul. 10, 2018

(54) METHOD AND COMPUTING DEVICE FOR MAINTAINING DEPENDENCIES AMONG REFERENCE ELEMENTS

(71) Applicant: WORKIVA INC., Ames, IA (US)

(72) Inventors: Dustin Hiatt, Ames, IA (US); Alexander Campbell, Ames, IA (US); Dean Anthony Ritz, Edmonds, WA (US)

(73) Assignee: Workiva Inc., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,200

(22) Filed: Jun. 21, 2016

(65) Prior Publication Data

US 2016/0342582 A1   Nov. 24, 2016

Related U.S. Application Data

(63) Continuation of application No. 14/850,156, filed on Sep. 10, 2015, now Pat. No. 9,378,269, which is a
(Continued)

(51) Int. Cl.
*G06F 17/24* (2006.01)
*G06F 17/30* (2006.01)
(Continued)

(52) U.S. Cl.
CPC ........ *G06F 17/246* (2013.01); *G06F 17/2247* (2013.01); *G06F 17/30598* (2013.01); *G06T 11/206* (2013.01)

(58) Field of Classification Search
CPC .............. G06F 17/2247; G06F 17/246; G06F 17/30598; G06F 17/30864; G06F 17/30554
See application file for complete search history.

(56) References Cited

U.S. PATENT DOCUMENTS 5,603,021 A   2/1997   Spencer et al.
5,883,623 A   3/1999   Cseri
(Continued)

FOREIGN PATENT DOCUMENTS

WO   2008/107665 A2   9/2008

OTHER PUBLICATIONS

Bewig, "How do you know your spreadsheet is right? Principles, Techniques and Practice of Spreadsheet Style," <http://www.eusprig.org/hdykysir.pdf>, Jul. 28, 2005, 14 pages.
(Continued)

*Primary Examiner* — Maikhanh Nguyen
(74) *Attorney, Agent, or Firm* — Drinker Biddle & Reath LLP

(57) ABSTRACT

The disclosure is generally directed to a method and computing device for maintaining dependencies among multiple reference elements (e.g., formulas of a table or spreadsheet). In various embodiments, prior to a reevaluation operation carried out on the reference elements, a computing device receives an input of a reference element via a user interface (e.g., receives a user's input of a formula), assigns the reference element to a group based on the dependency between the reference element and one or more other reference elements, and assigns the reference element to a location within a dependency graph to which the other reference elements are assigned. In response to an event that requires at least one of the reference elements to be reevaluated, the computing device reevaluates each group of reference elements in sequence a group at a time.

12 Claims, 13 Drawing Sheets

Related U.S. Application Data continuation of application No. 14/714,845, filed on May 18, 2015, now Pat. No. 9,158,832.

(51) Int. Cl.
*G06F 17/22* (2006.01)
*G06T 11/20* (2006.01)

(56) References Cited

U.S. PATENT DOCUMENTS

| | | | |
|---|---|---|---|
| 6,057,837 | A | 5/2000 | Hatakeda et al. |
| 6,138,130 | A | 10/2000 | Adler et al. |
| 6,460,059 | B1 | 10/2002 | Wisniewski |
| 6,948,154 | B1 | 9/2005 | Rothermel et al. |
| 7,792,847 | B2 | 9/2010 | Dickerman et al. |
| 7,984,371 | B2 | 7/2011 | Zdenek |
| 8,307,337 | B2 | 11/2012 | Chamieh et al. |
| 8,527,865 | B2 * | 9/2013 | Li .................. G06F 17/30592 707/694 |
| 8,607,207 | B2 | 12/2013 | Chamieh et al. |
| 8,645,929 | B2 | 2/2014 | Chamieh et al. |
| 8,745,483 | B2 | 6/2014 | Chavoustie et al. |
| 8,856,234 | B2 | 10/2014 | Kluin et al. |
| 8,869,020 | B2 | 10/2014 | Daga |
| 2002/0103825 | A1 | 8/2002 | Bauchot |
| 2006/0080594 | A1 | 4/2006 | Chavoustie et al. |
| 2006/0085386 | A1 | 4/2006 | Thanu et al. |
| 2006/0224946 | A1 | 10/2006 | Barrett et al. |
| 2007/0033519 | A1 | 2/2007 | Zdenek |
| 2007/0219956 | A1 | 9/2007 | Milton |
| 2008/0134138 | A1 | 6/2008 | Chamieh et al. |
| 2008/0148140 | A1 | 6/2008 | Nakano |
| 2008/0162532 | A1 | 7/2008 | Daga |
| 2009/0100324 | A1 | 4/2009 | Aureglia et al. |
| 2009/0150426 | A1 | 6/2009 | Cannon et al. |
| 2009/0292730 | A1 * | 11/2009 | Li .................. G06F 17/246 |
| 2010/0077331 | A1 | 3/2010 | Bargh et al. |
| 2013/0232475 | A1 | 9/2013 | Chamieh et al. |
| 2014/0188544 | A1 * | 7/2014 | Senescu ........... G06Q 10/0633 705/7.27 |

OTHER PUBLICATIONS

Burnett et al., "Testing Homogeneous Spreadsheet Grids with the "What You See Is What You Test" Methodology," IEEE Transactions on Software Engineering, Jun. 2002, vol. 28, No. 6, pp. 576-594.

Kankuzi, "A Dynamic Graph-based Visualization for Spreadsheets," University of Bostwana, Faculty of Science, Department of Computer Science, <http://www.researchgate.net/profile/Yirsaw_Ayalew2/publication/234808991_A_dynamic-graph-based_visualization_for spreadsheets/links/00b7d51a9b5169d566000000.pdf>, Jun. 2008, 121 pages.

Kankuzi et al., "An End-User Oriented Graph-Based Visualization for Spreadsheets," Proceedings of the 4th International Workshop on End-user Software Engineering, WEUSE '08, May 12, 2008, Leipzig, Germany, ACM, 2008, pp. 86-90.

Rothermel et al., "A Methodology for Testing Spreadsheets," ACM Transactions on Software Engineering and Methodology, Jan. 2001, vol. 10, No. 1, pp. 110-147.

Kamel et al., "Hilbert R-tree: An Improved R-tree Using Fractals," PVLDB '94 Proceedings of the 20th International Conference on Very Large Data Bases, Sep. 12-15, 1994, Morgan Kaufman Publishers Inc., San Francisco, CA, USA, 1994, pp. 500-509.

Sewall et al., "PALM: Parallel Architecture-Friendly Latch-Free Modifications to B+ Trees on Many-Core Processors," Proc. VLDB Endowment, 2011, pp. 795-806.

* cited by examiner

|   | A | B | C | D | E | F |
|---|---|---|---|---|---|---|
| 1 |   | =SUM(B8:B10) |   |   |   |   |
| 2 |   |   |   |   |   |   |
| 3 |   |   |   |   |   |   |
| 4 |   |   |   |   |   | =SUM(B5:B7) |
| 5 |   |   | =SUM(B1:B8) |   |   | =SUM(C6:C8) |
| 6 |   | 4 |   |   |   |   |
| 7 |   |   | =SUM(F3:F4) |   |   |   |
| 8 |   | =SUM(A6:C6) |   |   |   |   |
| 9 |   | =SUM(B2:B6) |   |   |   |   |
| 10 |   |   |   |   |   |   |

|   | A | B | C | D |
|---|---|---|---|---|
| 1 | | | | |
| 2 | Worksheet 1 | Income Statement | Current Period | |
| 3 | | Interest income | 45,000 | |
| 4 | | Non-interest income | 12,000 | |
| 5 | | Write down of real estate | (6,000) | |
| 6 | | Net income | 51,000 | |
| 7 | | | | |
| 8 | | | | |
| 9 | Worksheet 2 | Balance Sheet | Current Period | Prior Period |
| 10 | | Cash | 52,000 | 36,000 |
| 11 | | Real estate | 15,000 | 21,000 |
| 12 | | Total Assets | 67,000 | 57,000 |
| 13 | | | | |
| 14 | | | | |
| 15 | Worksheet 3 | Statement of Cash Flow | Current Period | |
| 16 | | Change in cash from operating activities | 16,000 | |
| 17 | | Net change in cash flows | 16,000 | |
| 18 | | Cash at beginning of period | 36,000 | |
| 19 | | Cash at end of period | 52,000 | |

|   | A | B | C | D |
|---|---|---|---|---|
| 1 |   |   |   |   |
| 2 | Worksheet 1 | Income Statement | Current Period |   |
| 3 |   | Interest income | 45,000 |   |
| 4 |   | Non-interest income | 12,000 |   |
| 5 |   | Write down of real estate | (6,000) |   |
| 6 |   | Net income | =sum(C3:C5) |   |
| 7 |   |   |   |   |
| 8 |   |   |   |   |
| 9 | Worksheet 2 | Balance Sheet | Current Period | Prior Period |
| 10 |   | Cash | link to source at C19 | 36,000 |
| 11 |   | Real estate | =D11+C5 | 21,000 |
| 12 |   | Total Assets | =sum(C3:C5) | =sum(D10:D11) |
| 13 |   |   |   |   |
| 14 |   |   |   |   |
| 15 | Worksheet 3 | Statement of Cash Flow | Current Period |   |
| 16 |   | Change in cash from operating activities | 16,000 |   |
| 17 |   | Net change in cash flows | =sum(C16) |   |
| 18 |   | Cash at beginning of period | link to source at D10 |   |
| 19 |   | Cash at end of period | =C18+C17 |   |

METHOD AND COMPUTING DEVICE FOR MAINTAINING DEPENDENCIES AMONG REFERENCE ELEMENTS

CROSS-REFERENCE TO RELATED APPLICATIONS

This application is a continuation of U.S. application Ser. No. 14/850,156, filed Sep. 10, 2015, issued as U.S. Pat. No. 9,378,269, which is a continuation of U.S. application Ser. No. 14/714,845, filed May 18, 2015, issued as U.S. Pat. No. 9,158,832, and incorporated by reference herein in their entirety.

TECHNICAL FIELD

The present disclosure relates generally to working with interdependent reference elements and, more particularly, maintaining dependencies among reference elements.

BACKGROUND

Keeping track of different types of data entries and interdependencies among the different entries is a task for which computers are ideally suited, and modern society depends heavily on this capability. From social networking platforms to financial analysis applications, computers, along with robust communication networks, are able to propagate a change in one data item (e.g., a change in a cell of a spreadsheet or a change in a user's status on a social network) to other data items (e.g., a recalculation of a formula in a spreadsheet or an update of an emoticon on the devices of the user's friends).

One problem that arises with propagating changes among many interdependent data entries is that it can be very slow when the number of entries and interdependencies is high and when the entries are stored across different documents, databases, servers and different geographical locations of the servers. For example, those who work with large spreadsheets are familiar with the experience in which, when a change is made to one cell of a spreadsheet, the spreadsheet program spends a long time updating itself repeatedly as the formulas depending on the changed cell get recalculated, the formulas depending on those formulas get recalculated, and so on. Dependencies that cross documents or servers create similar delays.

DRAWINGS

While the appended claims set forth the features of the present techniques with particularity, these techniques, together with their objects and advantages, may be best understood from the following detailed description taken in conjunction with the accompanying drawings of which:

FIG. 3 shows a spreadsheet that helps illustrate an embodiment;

FIG. 9A, FIG. 9B, and FIG. 9C show another spreadsheet on a user interface to help illustrate another embodiment.

DESCRIPTION

Figure 1:
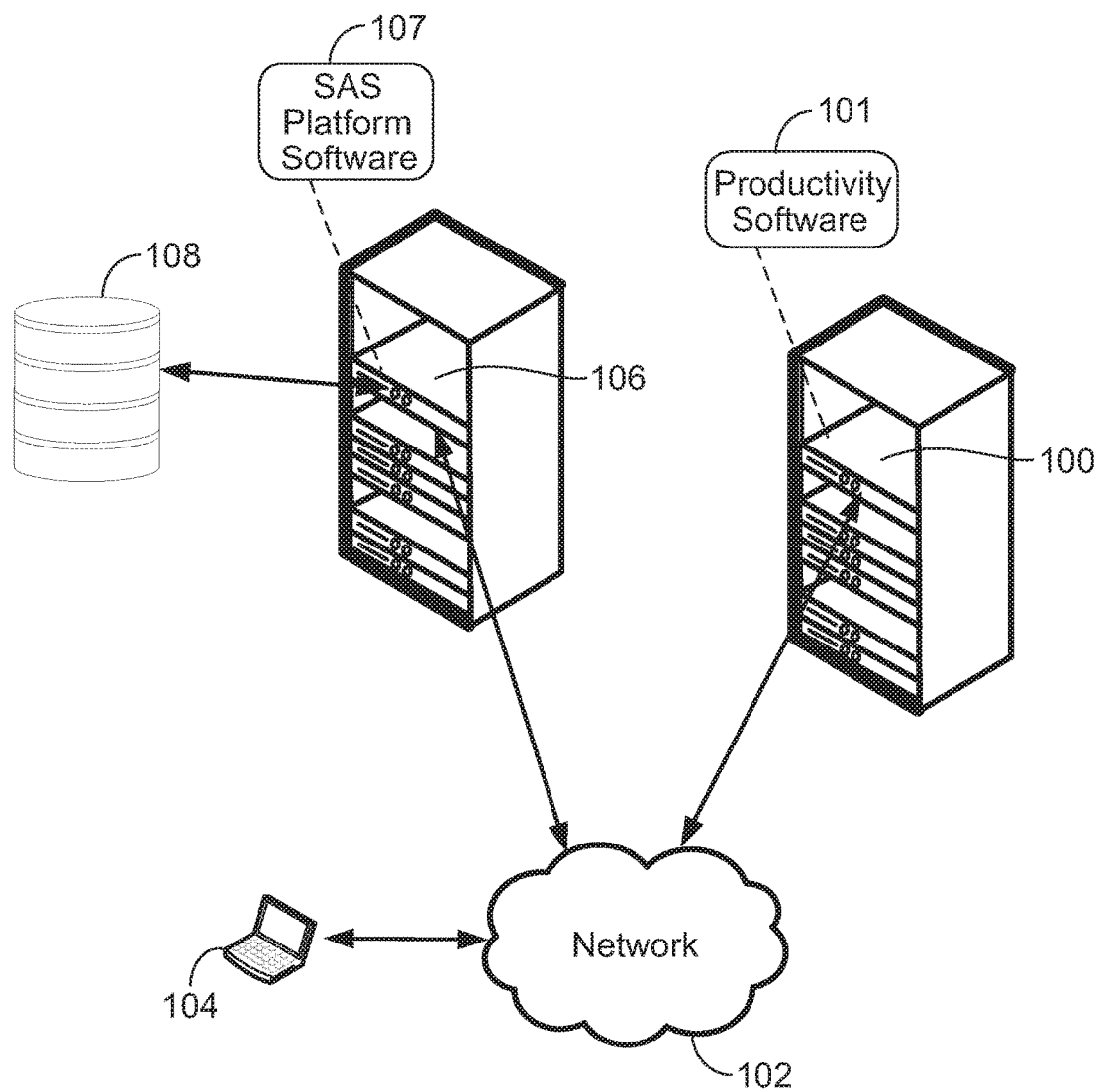
FIG. 1 is an example of a networking environment in which various embodiments of the disclosure may be employed.

The disclosure is generally directed to a method and computing device for maintaining dependencies among multiple reference elements (e.g., formulas of a table or spreadsheet). In various embodiments, prior to a reevaluation operation carried out on the reference elements, a computing device (or processor thereof) receives an input of a reference element via a user interface (e.g., receives a user's input of a formula), assigns the reference element to a group based on the dependency (e.g., one-way dependency or two-way dependency) between the reference element and one or more other reference elements, and assigns the reference element to a location within a dependency graph to which the other reference elements are assigned. In response to an event that requires at least one of the reference elements to be reevaluated (e.g., the input or change of a constant or of a formula on which at least one of the other formulas relies), the computing device reevaluates each group of reference elements (e.g., recalculates each group of formulas) in sequence a group at a time (e.g., all of the formulas in group zero, then all of formulas in group one, etc.). In reevaluating the reference elements of each group, the computing device reevaluates the reference elements in parallel (e.g., recalculates all of the formulas in group zero in parallel, each recalculation being carried out on a separate thread of execution and, if available, on a separate processor or processor core). The computing device displays the results of the reevaluation operation on a display device in communication with the computing device (e.g., integrated with the computing device or integrated with another computing device remotely located from, but in communication with, the first computing device). Displaying the results may involve displaying a table with the results of a formula recalculation or displaying a spreadsheet with the results of a formula recalculation.

Possible implementations of the reference elements include formulas, links, a combination of formulas and links that are located (1) in different cells of a single spreadsheet, (2) in different cells of a table embedded in a non-spreadsheet document, (3) distributed across multiple spreadsheets or multiple documents.

In another embodiment, a computing device maintains dependencies among reference elements (e.g., of a table) by maintaining an interval-based dependency graph in a computer memory such that each node of the graph is associated with at least one of the reference elements, and each node of the graph represents a range of locations of the reference elements (e.g., cells of the table). The computing device assigns a group identifier to each reference element such that no two reference elements having the same group identifier are related by dependency, either one-way or two-way. In response to an event requiring the reevaluation of one or more of the reference elements of the plurality, the computing device reevaluates the one or more reference elements, sequentially by group, according to the respective group identifiers of the one or more reference elements, and displays the result of the reevaluation (e.g., in the table) on a display device.

In an embodiment, the computing device maintains an interval-based dependency graph and a range tree in a computer memory. Each node of the dependency graph (1) is associated with one or more formulas of a spreadsheet, and (2) represents a range of cells of the spreadsheet on which the one or more formulas associated with the node depends. Each node of the range tree represents a formula of the spreadsheet and is positioned within the range tree according to the location of the formula within the spreadsheet (e.g., positioned according to the row and column of the cell of the spreadsheet in which it resides).

To determine the criticality of a given reference element (e.g., a given formula of a spreadsheet) according to an embodiment, the computing device (1) searches the dependency graph to identify other reference elements that depend on the given reference element, (2) repeats the searching of the dependency graph to find the reference elements that depend on the first set of reference elements identified, the second set, and so on, until there are no further, non-circular reference elements that depend on the given reference element, (3) determines the criticality of the given reference element based on the total number of reference elements that depend either directly or indirectly on the given reference element, and (4) visually indicates the determined criticality of the given reference element on a display device.

To determine the fragility of a given reference element (e.g., a given formula of a spreadsheet) according to an embodiment, the computing device (1) analyzes the abstract syntax tree ("AST") of the given reference element to determine which locations (e.g., which other formulas contained in relied-upon cells) the given reference element depends on, (2) searches the range tree to determine which of those locations contain reference elements that the given reference element depends on, (3) repeats the AST analysis and the range tree search for each of the first set of reference elements located in the range tree search, the second set of reference elements located in the subsequent search, and so on, until there are no further, non-circular reference elements that depend on the given reference element, (4) determines the fragility of the given reference element based on the total number of reference elements that the given reference element depends directly on or indirectly on, and (5) visually indicates the determined fragility of the given reference element on a display device.

The term "graph" as used herein refers to a representation of a set of objects, in which at least some pairs of objects in the set are connected to one another by one or more edges. Each of the objects occupies a vertex of the graph. An "interval-based dependency graph" or "dependency graph" as used herein is a data structure that represents the interdependencies of a set of formulas or other mechanisms of reference between objects by way of a graph, with the instantiation of each vertex being referred to as a "node." Possible implementations of a dependency graph include an interval tree and a skip list. The term "reference element" as used herein is an electronically-stored object (such as a formula, function) that establishes a unidirectional or bidirectional link between at least two objects (such as between at least two cells of a spreadsheet or at least two cells of different spreadsheets). An example of a reference element is a formula contained in a cell of a spreadsheet, wherein the formula refers to (relies upon) the value contained in some other cell of the spreadsheet (or a cell of a different spreadsheet or which, itself, may be the result of a formula calculation) in order to calculate a result. The term "table" as used herein is collection of data organized into rows and columns. Examples of tables include a spreadsheet and a worksheet. A table may be embedded within any sort of document. Finally, "document" as used herein includes any type of electronically stored document, including text documents, spreadsheets, presentations, drawings, diagrams, and composite documents that include elements of different types of documents.

Various embodiments of the disclosure are implemented in a computer networking environment. Turning to FIG. 1, an example of such an environment is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104 and a third computing device 106. It is to be understood that the various embodiments may be carried out on the first computing device 100, the second computing device 104, or other computing devices not depicted, with the second computing device 104 accessing the first computing device 100 via a thin, web-based client.

In an embodiment, the first computing device 100 executes productivity software 101 and the third computing device 106 executes software as a service ("SAS") platform software 107. In order to access various reference elements in an embodiment, the productivity software 101 transmits commands to the SAS platform 107 along one or more element identifiers ("IDs"). The SAS platform software 107 uses the one or more element IDs as indices to retrieve the one or more elements (including reference elements) from a media storage device 108.

Figure 2:
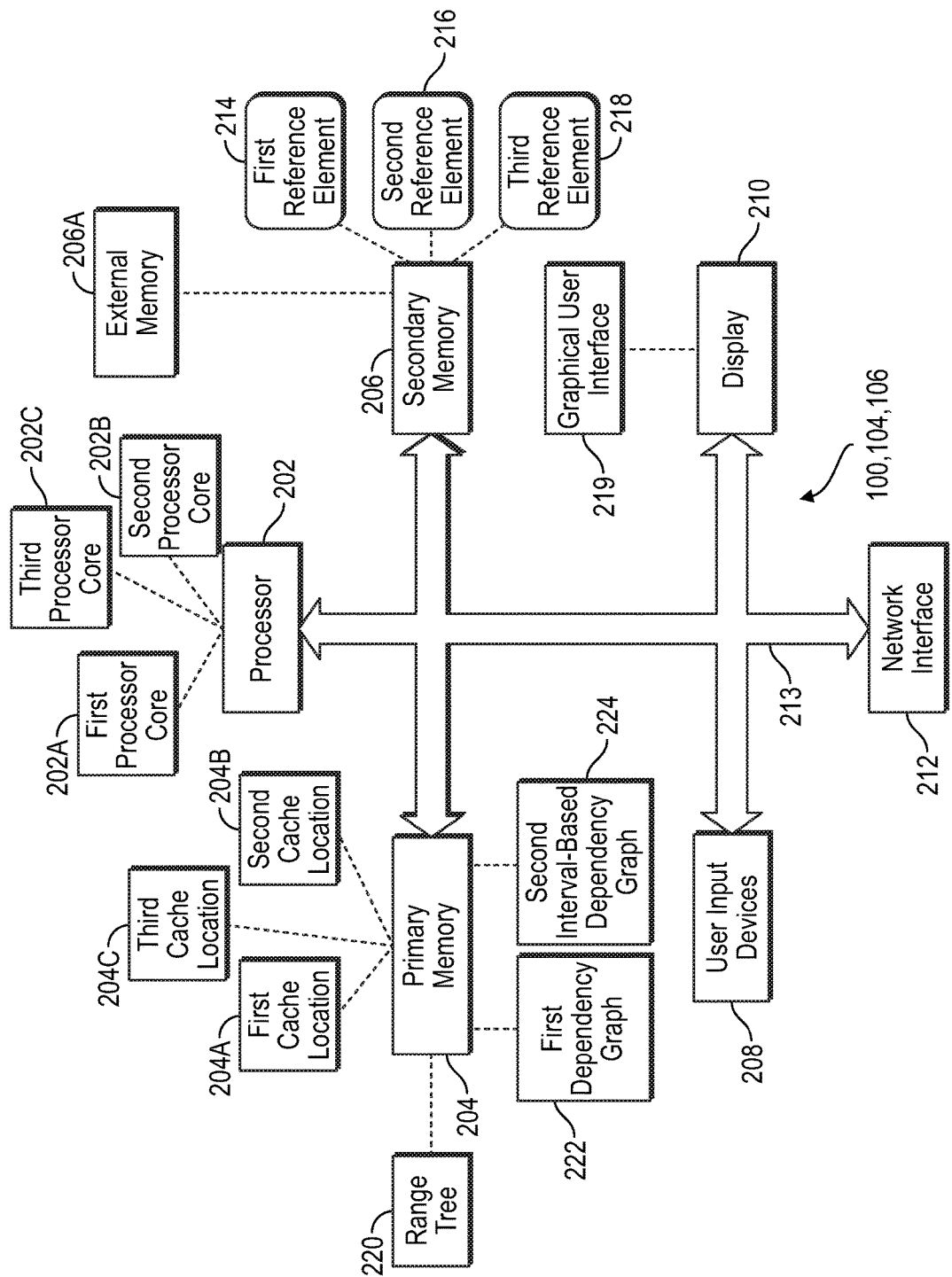
FIG. 2 is a block diagram of a computing device according to an embodiment.

In one implementation, one or more of the computing devices of FIG. 1 have the general architecture shown in FIG. 2. The computing device includes processor hardware 202 (e.g., a microprocessor, controller, or application-specific integrated circuit) (hereinafter "processor 202"), a primary memory 204 (e.g., volatile memory, random-access memory), a secondary memory 206 (e.g., non-volatile memory), user input devices 208 (e.g., a keyboard, mouse, or touchscreen), a display device 210 (e.g., an organic, light-emitting diode display), and a network interface 212 (which may be wired or wireless). Each of the elements of FIG. 2 is communicatively linked to one or more other elements via one or more data pathways 213. Possible implementations of the data pathways 213 include wires, conductive pathways on a microchip, and wireless connections. In an embodiment, the processor 202 is one of multiple processors in the computing device, each of which is capable of executing a separate thread. In an embodiment, the processor 202 communicates with other processors external to the computing device in order to initiate the execution of different threads on those other processors.

In some embodiments, the primary memory 204 includes multiple cache locations, represented in FIG. 2 by a first cache location 204A, a second cache location 204B, and a third cache location 204C. In an embodiment, the processor 202 includes multiple processor cores, represented in FIG. 2 by a first processor core 202A, a second processor core 202B, and a third processor core 202C. Each processor core is capable of operating independently of the other processor cores, and is capable of carrying out a separate thread of execution (e.g., by retrieving instructions and data from the primary memory 204). Thus, two or more of the processor cores can execute threads in parallel and independently.

The memories 204 and 206 store instructions and data. In some embodiments, the secondary memory 206 is implemented as, or supplemented by an external memory 206A. The media storage device 108 is a possible implementation of the external memory 206A. The processor 202 executes the instructions and uses the data to carry out various procedures including, in some embodiments, the methods described herein, including displaying a graphical user interface 219. The graphical user interface 219 is, according to one embodiment, software that the processor 202 executes to display a spreadsheet on the display device 210, and which permits a user to make inputs into the various cells of the spreadsheet via the user input devices 208.

Stored within the secondary memory 206 (or the external memory 206A) are one or more reference elements, represented in FIG. 2 by a first reference element 214, a second reference element 216, and a third reference element 218. Each reference element includes one or more data structures including: (1) an AST having information regarding how the reference element (e.g., the spreadsheet cell formula) is to be interpreted and (2) a data structure (such as a bit array) representing the location or locations (e.g., the spreadsheet cell locations) of data on which the reference element depends. Each reference element can be referenced by its own, unique element ID. One possible implementation of an element ID is a Globally Unique Identifier ("GUID"). According to an embodiment, each reference element is a data structure that corresponds to a cell in a spreadsheet. If the cell contains a formula, then the reference element includes a pointer to an AST for the formula.

In an embodiment, the processor 202 maintains a range tree 220 in the primary memory 204. Each node of the range tree 220 is associated with one or more reference elements. In one implementation, each node of the range tree 220 represents a cell of a spreadsheet that contains a formula. As will be discussed below in further detail, the processor 202 may, for a given formula of the spreadsheet, search the range tree 220 to identify which cells contain formulas. The range tree 220 may one of multiple range trees. According to various embodiments, the processor 202 also maintains a first dependency graph 222 and a second dependency graph 224, each of which is interval-based, and each of whose functionality will be described below in further detail. In some embodiments, the processor 202 only maintains a single dependency graph. In others, the processor 202 maintains more than two dependency graphs.

In an embodiment, the processor 202 retrieves multiple pieces of data from its own memory (one or both of its primary memory and its secondary memory) or from an external data storage device (e.g., from the media storage device 108 via request sent to the third computing device 106) to assemble a spreadsheet. In order to illustrate principles of the various embodiments, an example of a spreadsheet is shown in FIG. 3. The spreadsheet, generally labeled 300, has a number of cells that are organized into rows and columns. The spreadsheet 300 would ordinarily not display the formulas within the cells, but instead would display the evaluated result of the formulas with the cells and the formulas above within a formula bar. However, for ease of reference, the formulas are shown in FIG. 3 inside the respective cells they govern. Each cell has an element ID that the processor 202 may use to retrieve the contents of the cell, including the formula of the cell (if it has a formula) and the value contained in the cell (either a constant or the calculated result of a formula). Although the only type of formula shown in FIG. 3 is a "sum" formula, it is to be understood that other types of formulas are possible. Additionally, a cell might contain a link to another cell, and such a link could be treated the same way as a formula for the techniques described herein.

According to an embodiment, for each cell in FIG. 3, the processor 202 uses a numerical value to represent the row (starting with zero, so that row one is represented by the value zero, row two is represented by the value one, row three is represented by the value two, etc.) and a numerical value to represent the column (starting with zero, where column A is represented by the value zero, column B is represented by the value one, column C is represented by the value two, etc.). The processor 202 represents each interval as a starting point (inclusive) followed by an ending point (exclusive). For example, processor 202 represents a column interval from column A to column A by the interval [0,1). In an embodiment, the processor 202 uses these numerical values to calculate the size of the interval as the difference from the ending point to the starting point. For example, the size of the column interval from column A to column A is 1−0=1. For the sake of clarity, however, the intervals of rows and columns will hereafter be described in terms of rows and column notations of FIG. 3 with inclusive endpoints. Thus, for example, the range of cells from A6 to C6 will be said to include the row interval [6,6] and the column interval [A,C].

In an embodiment, when the computing device (e.g., the first computing device 100) receives the input of a formula into a spreadsheet (e.g., from the second computing device 104 via the network 102), the processor 202 analyzes the AST of the formula to determine which cells the formula references, populates the data structure (e.g., a bit array) with data representing those cells, and associates the cell into which the formula has been input with the appropriate nodes of the dependency graphs 222 and 224. Furthermore, the processor 202 inserts a node into the range tree 220 corresponding to the cell location (e.g., A6) into which the formula is input. Additionally, the processor 202 analyzes the range tree 220 and the dependency graphs 222 and 224 in order to determine which formulas of the spreadsheet may be carried out in parallel, assign the newly-input formula to a group based on this analysis, and update any previously-assigned groups of other, previously-input formulas based on the analysis. According to various embodiments, the processor 202 carries out these operations in such a way and with such timing that they are complete by the time an event requiring recalculation of the spreadsheet is required (e.g., immediately upon input of the formula).

Figure 4:
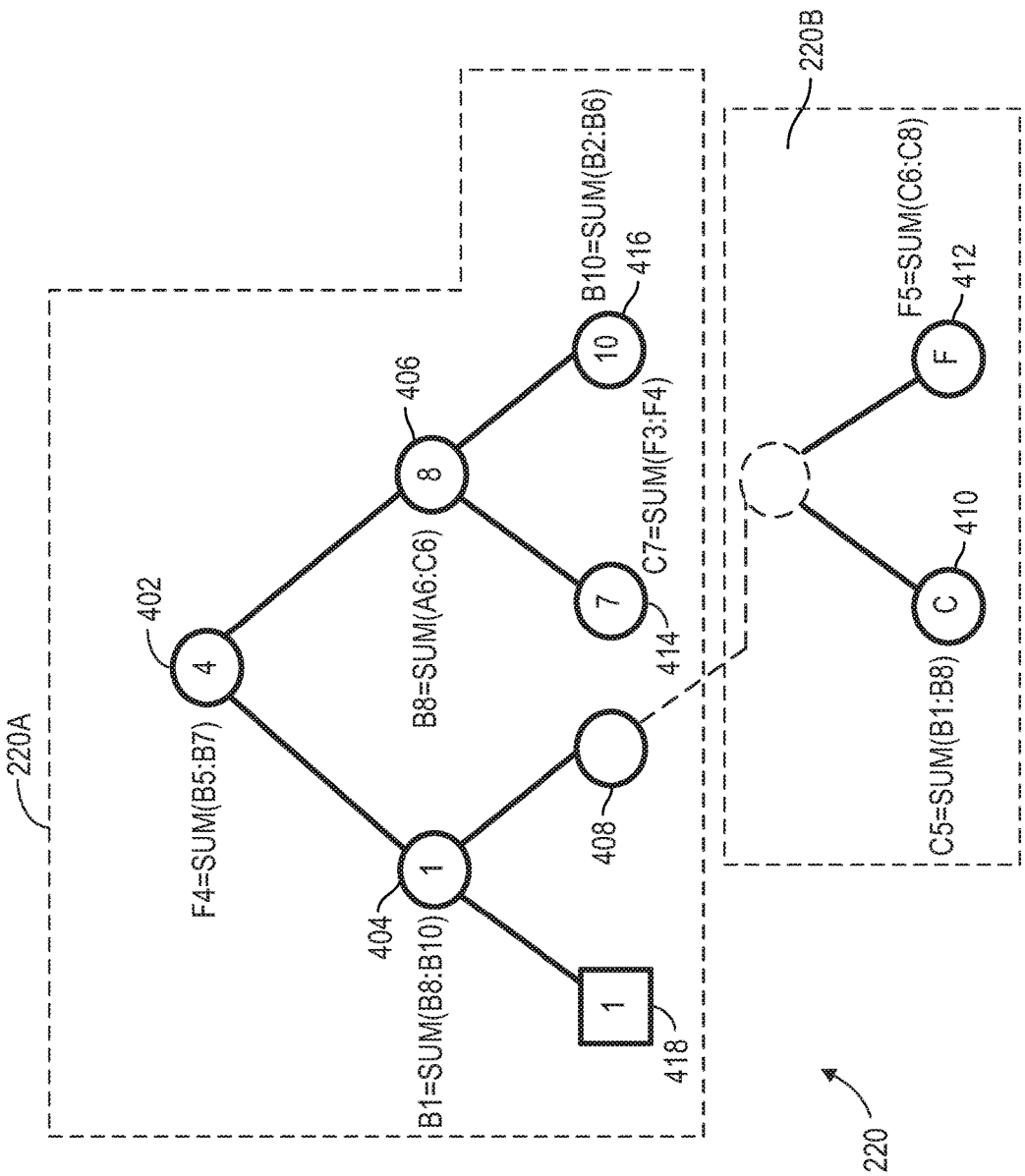
FIG. 4 shows a range tree according to an embodiment.

Turning to FIG. 4, a possible implementation of the range tree 220 for the spreadsheet of FIG. 3 is shown. The range tree 220 in this example is a two-dimensional range tree, with a first dimension (region 220A) representing the rows of the spreadsheet 300, and a second dimension (region 220B) representing the columns. The rows and columns are denoted in FIG. 4 by their actual row and column values in FIG. 3 for ease of reference. In other implementations, however, the rows and columns would both be numerically represented and start from zero. Associated with each node of the range tree 220 is a cell of the spreadsheet 300 (whose location and formula are textually shown within the node in FIG. 4 for convenient reference). In some embodiments, an object containing serialized data for the cell (e.g., the value in the cell, and a pointer to the root node of an AST, if the cell contains a formula, or a null pointer, if the cell does not contain a formula) is part of the node. The range tree in this implementation only includes nodes corresponding to those cells in the spreadsheet 300 containing formulas. In some embodiments, however, the range tree 220 would include a node for each cell having a value in it, and the processor 202 would distinguish between nodes representing formula-containing cells and nodes representing non-formula-containing cells by reading the AST pointer of the cell object. Additionally, the processor 202 could treat linking references the same way it treats formulas. For example, if a cell merely contained a link to some other cell (e.g., cell B9 might contain a link to cell B10, such that cell B9's value was always the same as that of cell B10), the processor 202 could include such a cell in any search of the range tree 220.

The nodes of the range tree 220 are connected with one another by edges as shown in FIG. 4. For example, in the first region 220A of the range tree 220: a first node 402 represents cell F4; a second node 404 represents cell B1; a third node 406 represents cell B8; a fourth node 408 refers to a second region 220B (in a second dimension) having a fifth node 410 representing cell C5 and a sixth node 412 representing cell F5; a seventh node 414 represents cell C7; and an eighth node 416 represents cell B10. The first region 220A also includes a duplicate node 418 for the purpose of balancing the tree. Naturally, the processor 202 may create and maintain more complex two-dimensional structures for other spreadsheets. For the sake of clarity, only the fourth node 408 is depicted as having a second dimension.

Figure 5A:
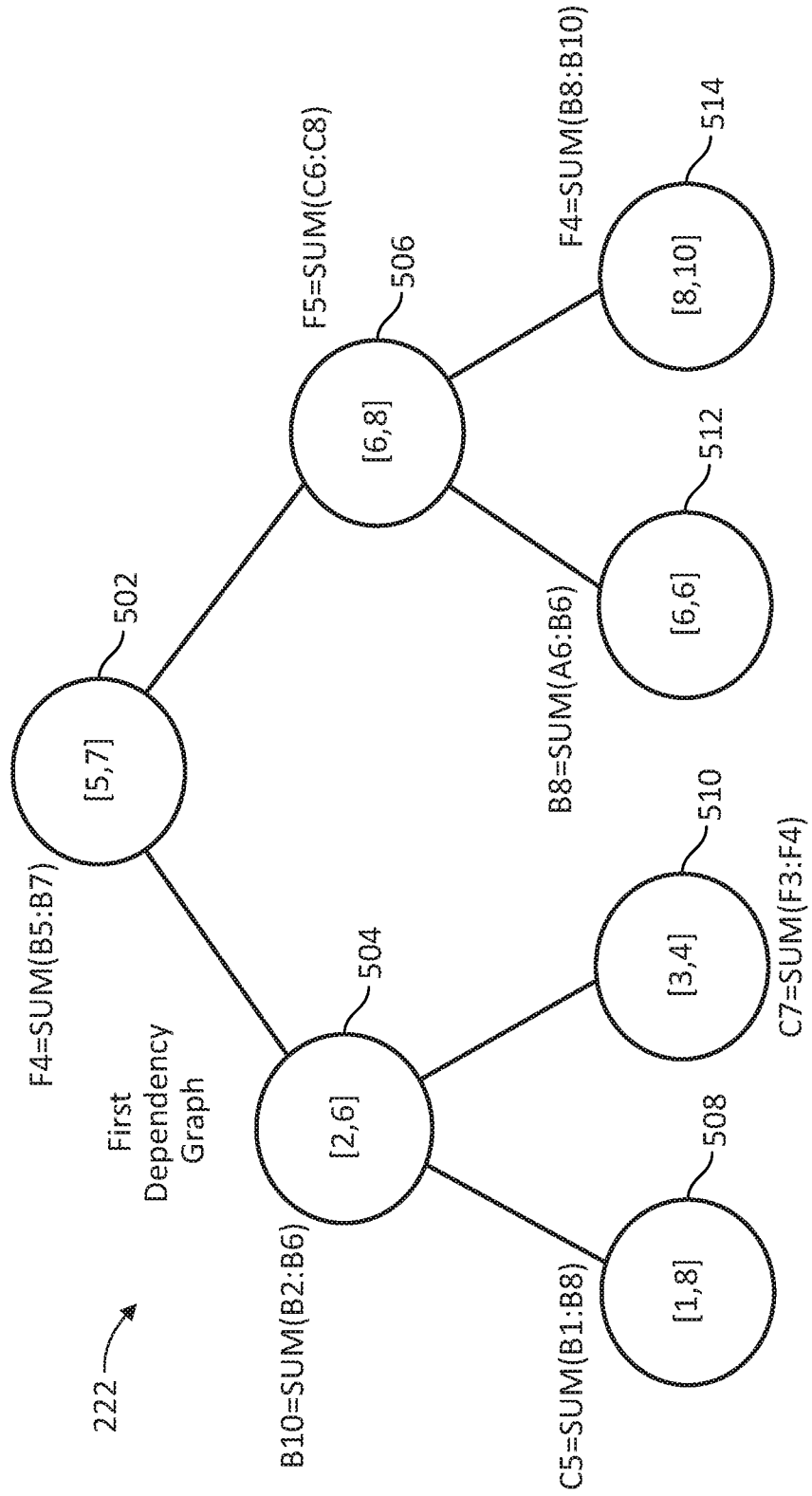
FIG. 5A shows a first dependency graph according to an embodiment.
Figure 5B:
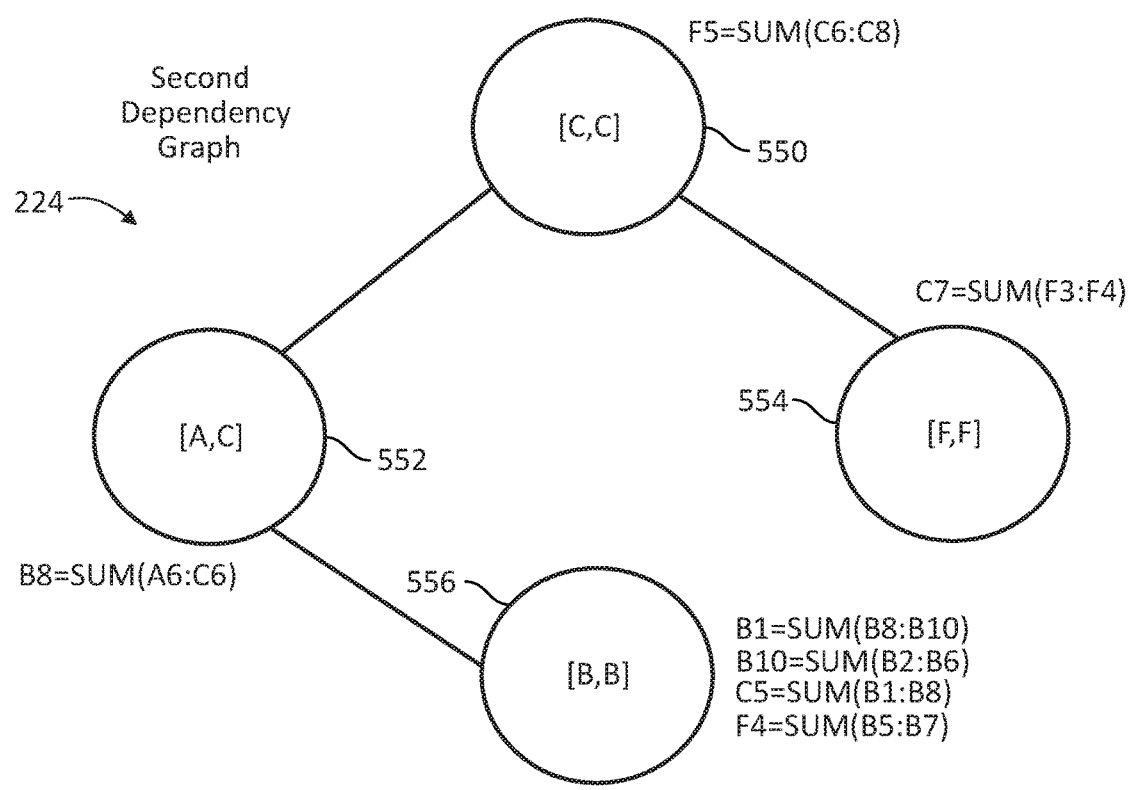
FIG. 5B shows a second dependency graph according to an embodiment.

Turning to FIG. 5A and FIG. 5B, possible implementations of the first dependency graph 222 and the second dependency graph 224 for the spreadsheet of FIG. 3 are shown. The first dependency graph 222 (FIG. 5A) in this example is a row interval tree, and the second dependency graph 224 (FIG. 5B) is a column interval tree. As with FIG. 4, the rows and columns of FIG. 5A and FIG. 5B are denoted by their actual row and column values (from FIG. 3) for ease of reference. In other implementations, however, the rows and columns would both be numerically represented and start from zero. Associated with each node of the first dependency graph 222 and the second dependency graph 224 is at least one cell of the spreadsheet 300 (whose location and formula are textually shown within the node for convenient reference) that depends on at least one cell that falls within the range of rows or columns represented by the node. This may include, for example, a dependency based on a formula or a dependency based on a link.

Continuing with FIG. 5A, the processor 202 creates and maintains first dependency graph 222 to track the rows on which each of the formulas of the spreadsheet 300 depends. The first dependency graph 222 in this example includes: a first node 502 representing the interval of row five to row seven and associated with cell F4; a second node 504 representing the interval of row two to row six and associated with cell B10; a third node 506 representing the interval of row six to row eight and associated with cell F5; a fourth node 508 representing the interval of row one to row eight and associated with cell C5; a fifth node 510 representing the interval of row three to row four and associated with cell C7; a sixth node 512 representing row six only and associated with cell B8; and a seventh node 514 representing the interval of row eight to row ten and associated with cell F4.

Turning to FIG. 5B, the processor 202 creates and maintains the second dependency graph 224 to track the columns on which each of the formulas of the spreadsheet 300 depends. The second dependency graph 224 in this example includes: a first node 550 representing column C only and associated with cell F5; a second node 552 representing the interval of column A to column C and associated with cell B8; a third node 554 representing column F only and associated with cell C7; and a fourth node 556 representing column B only and associated with cells B1, B10, C5, and F4.

For ease of reference, Table 1 maps the cells of FIG. 3 (via their respective formulas) to their row intervals in the first dependency graph 222 ("Depends on Row Interval"), their column intervals in the second dependency graph 224 ("Depends on Column Interval"), the identity of cells that would be returned in a search of the range tree 220 ("Depended on By"), and the respective calculation groups of the formulas, which will be described below in more detail ("Group"). The notation "=SUM(X:Y)" means "sum the values from cell X to cell Y, inclusive."

TABLE 1

| Cell | Formula | Depends on Row Interval | Depends on Column | Depended on By | Group |
|---|---|---|---|---|---|
| B10 | =SUM(B2:B6) | [2, 6] | [B, B] | B1, C5 | 0 |
| F4 | =SUM(B5:B7) | [5, 7] | [B, B] | C7, F5 | 0 |
| B8 | =SUM(A6:C6) | [6, 6] | [A, C] | B1, C5 | 0 |
| C7 | =SUM(F3:F4) | [3, 4] | [F, F] | F5 | 1 |
| B1 | =SUM(B8:B10) | [8, 10] | [B, B] | C5 | 1 |
| C5 | =SUM(B1:B8) | [1, 8] | [B, B] | — | 2 |
| F5 | =SUM(C6:C8) | [6, 8] | [C, C] | — | 2 |

In an embodiment, when the processor 202 detects that a cell of a spreadsheet has been edited, the processor 202 searches the dependency graphs 222 and 224 to identify all formulas in the spreadsheet that are interested in (i.e., depend on) that cell, and executes these formulas group by group, with formulas in each group being executed in parallel with one another.

Figure 6A:
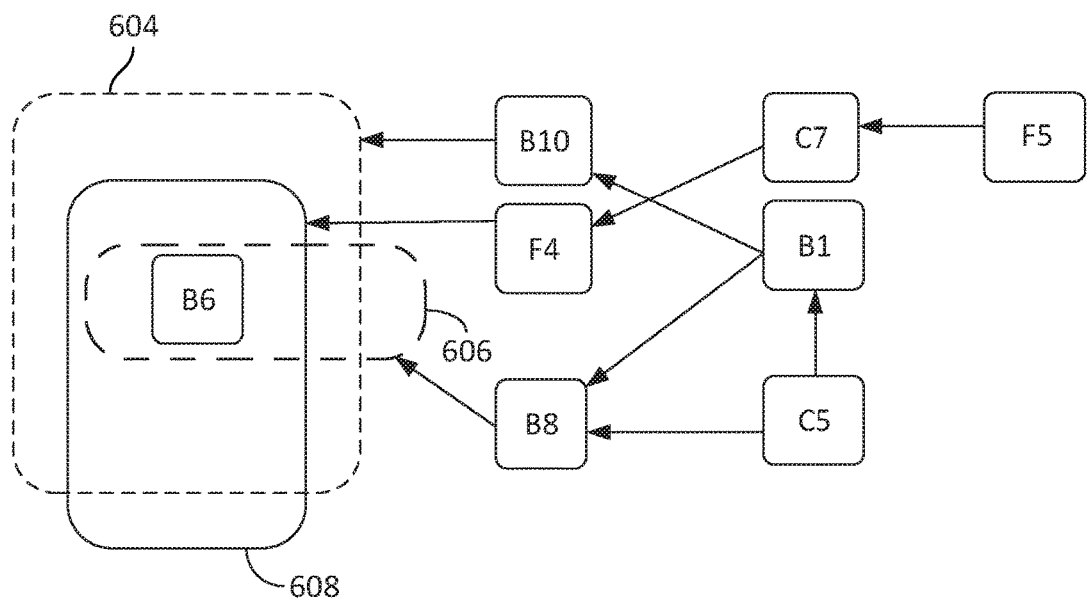
FIG. 6A and FIG. 6C depict the dependencies among formulas of a spreadsheet according to different embodiments.
Figure 6B:
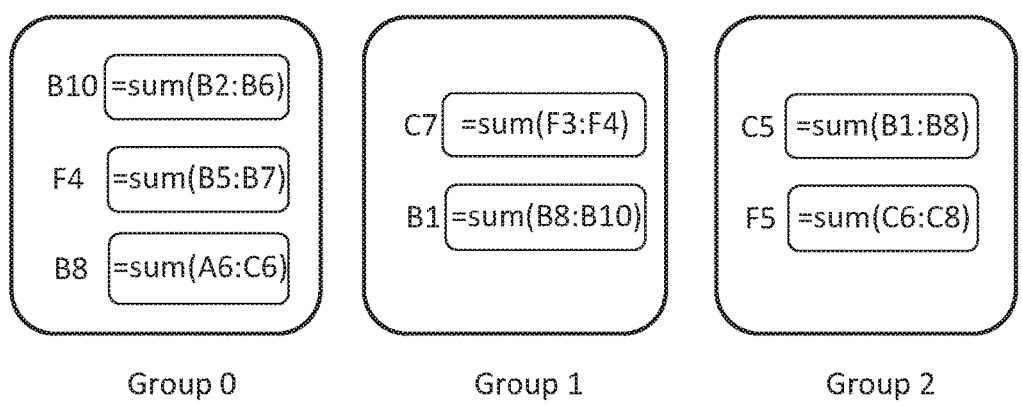
FIG. 6B and FIG. 6D depict the grouping of the formulas of a spreadsheet into groups for parallel processing according to different embodiments.

Turning to FIG. 6A, a representation of the interdependencies among the formulas of the spreadsheet 300 is depicted. For the sake of example, this representation assumes that the value in cell B6 is changed (e.g., from '4' to '5'). The range of cells on which the formula of cell B10 depends is represented by a box 604, the range of cells on which the formula of cell B8 depends is represented by a box 606, and the range of cells on which the formula of F4 depends is represented by a box 608. In an embodiment, the processor 202 groups the formulas according to their dependencies as shown in FIG. 6B, and recalculates the formulas (based on the new value) in each group in parallel using multiple processors and multiple processor cores in order to optimize the speed of the recalculation.

Figure 7:
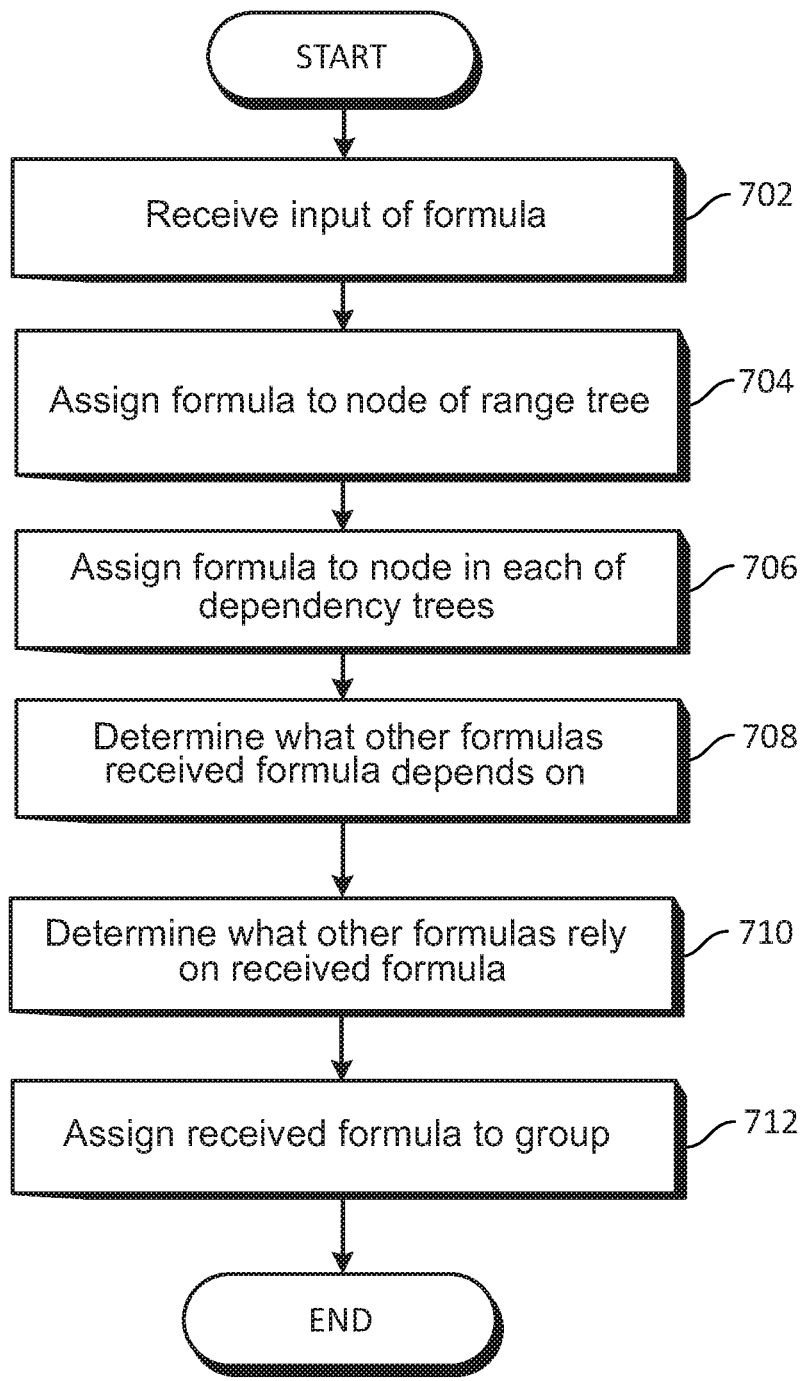
FIG. 7 shows a an example of how a computing device maintains dependencies among reference elements in an embodiment.

Turning to FIG. 7, an example of how a computing device maintains dependencies among reference elements in an embodiment is described. In this example, it will be assumed that the processor 202 is carrying out the actions on the first computing device 100 and that the reference elements are formulas of a spreadsheet. It is to be understood that, although the actions are depicted as occurring in sequence, many of them may be performed in parallel. At block 702, the processor 202 receives an input of a formula into the spreadsheet. For example, assume that the first computing device 100 hosts the spreadsheet 300 by executing the productivity software 101 on the processor 202, and that the second computing device 104 executes a web browser that interacts with the productivity software 101 to display the spreadsheet 300. Further assume that a user interacts with the second computing device 104 to input the formula "=SUM(B2:B6)" into cell B10 of the spreadsheet 300. The second computing device 104 transmits the input formula to the first computing device 100 via the network 102. The processor 202 (assumed to be part of the first computing device 100 in this example) receives the input formula and creates an AST for the formula.

At block 704, the processor 202 assigns the received formula to a node (creating the node if necessary) in the range tree 220. For example, the processor 202 may assign the formula to a node based on the location (row and column) of the cell within the spreadsheet 300.

At block 706, the processor 202 assigns the received formula to a node (again, creating the node, if necessary) in each of the dependency graphs 222 and 224.

At block 708, the processor 202 determines what other cells with formulas the received formula depends upon. For example, the processor 202 analyzes the AST of the received formula to determine which cell intervals the received formula depends upon and then queries the range tree 220 to determine which, if any, of those depended-upon cells contain formulas.

At block 710, the processor 202 determines (e.g., by querying the dependency graph 222 and 224) what other formulas rely upon the received formula.

At block 712, the processor 202 assigns the formula to a group based on the determinations it made at block 708 and, if necessary, block 710. In assigning the formula to a group, the processor 202 selects the first group in which the received formula can be safely calculated after dependencies on other formulas have been resolved. For example, assume that the spreadsheet 300 is in an initial, blank state (i.e., there are no other formulas in the spreadsheet), so the processor 202 receives a result of "zero hits" back from the query to the range tree 220. The processor 202 determines, based on the result, that the received formula is not dependent on any other formulas. The processor 202 therefore assigns the formula to the first group ("Group 0"), as shown in FIG. 6B.

To illustrate how a formula might be moved from one group to another, assume that, after inputting the formula in B10, the user inputs the formula of C5, which is "=SUM (B1:B8)." The processor 202 queries the range tree 220 at block 708 and receives one hit back from the range tree 220—that of the cell B10. The processor 202 determines the group to which the formula of cell B10 was assigned— Group 0 in this case—and assigns the formula of C5 to the next available group—the second group ("Group 1"). The processor 202 also queries the first and second dependency graphs 222 and 224 and determines that there are no formulas in the spreadsheet 300 that depend on it (i.e., depend on C5). Further assume that the user subsequently inputs still another formula into the spreadsheet 300—the formula of B1, which is "=SUM(B8:B10)." The processor 202 carries out block 708 and, as a result of the query of the range tree 220, receives a result of B10. The processor 202 also carries out block 710 for the formula of B1 and determines, based on the query of the dependency graphs 222 and 224, that the formula of C5 is dependent on B1. Consequently, the processor 202 assigns the formula of B1 to the next available group after B 10's group—Group 1—and reassigns the formula of C5 to the next available group after B1's group, which is Group 2. In other words, the processor 202 identifies the dependency of C5 on B1 and, because B1 needs to be calculated before C5, bumps C5 from Group 1 and into the next group.

In an embodiment, a computing device uses a range tree and a dependency graph (e.g., such as the range trees and dependency graphs discussed herein) to identify dependencies among multiple reference elements (e.g., to identify what depends on each reference element and to identify what each reference element depends on) by carrying out a flattening process on the dependency graph. Additionally, the computing device can use this process to identify those reference elements that are circular. A reference element is "circular" if it refers to at least one other reference element that refers back to it. An example of a circular reference element would be if cell A1 had the formula "=A2+3" and cell A2 had the formula "A1-3." The formula in A1 and the formula in A2 would each be considered a circular reference element. A circular reference may be many levels deep.

Figure 6C:
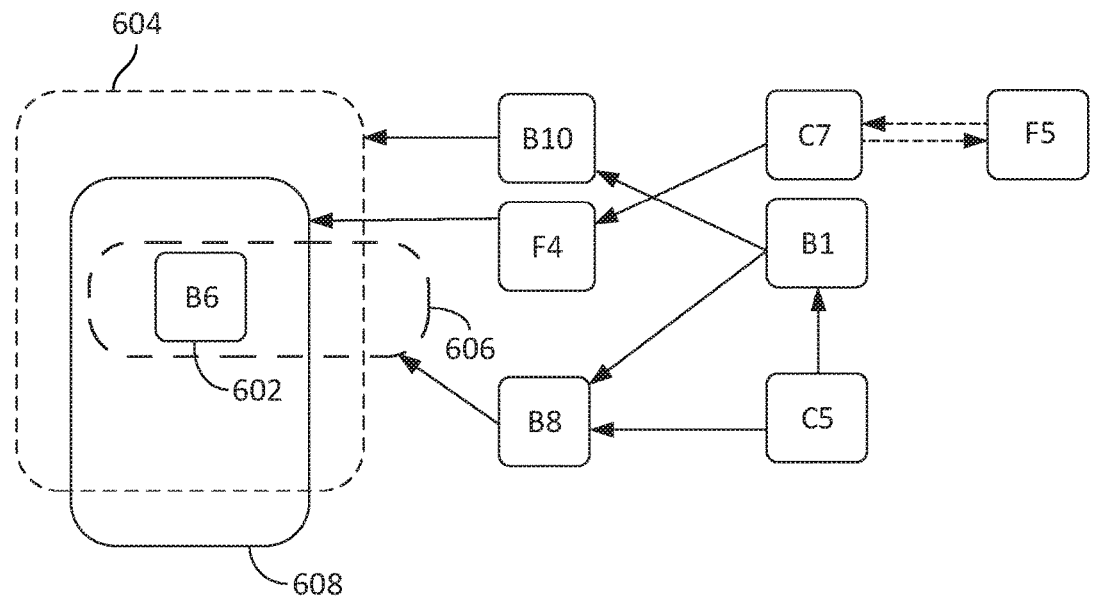
Figure 6D:
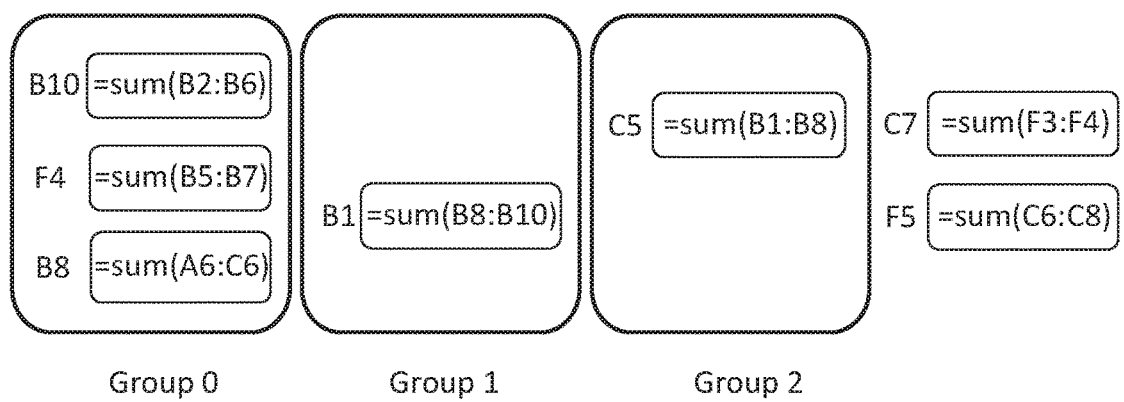

For example, the processor 202 would, for a given formula of the spreadsheet 300, carry out the operation of assigning the formulas to groups as described above, and iterate through the dependency graphs 222 and 224 until it reached an iteration where it could not flatten any more formulas, i.e., it has traversed the entire dependency graph originating with the input initiating this process. At that point, the processor 202 designates as circular those formulas that have not been assigned to a group. Some formulas designated as circular might not be directly circular, but may just depend on circular formulas. To illustrate an embodiment having circular reference, the diagrams of FIG. 6C and FIG. 6D use the formulas of the spreadsheet 300 but with one change: the formula for C7 is "=SUM(F4:F5)" instead of "=SUM(F3:F4)." Consequently, if the processor 202 carries out the grouping operation described above, then the formulas for cells C7 and F5 would be separated out into a separate circularity group of their own for processing. In some cases, processing these formulas would involve displaying an error message on the user interface 219.

Figure 8:
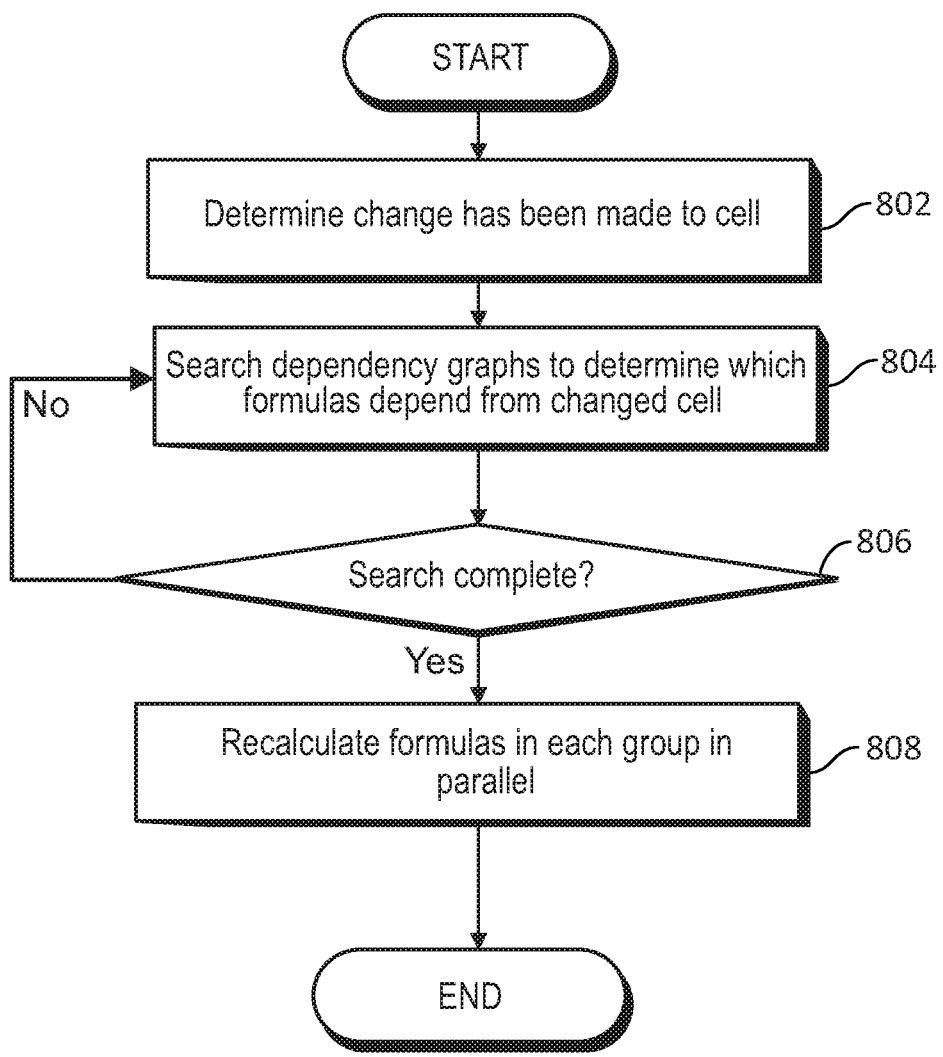
FIG. 8 shows an example of how a computing device reevaluates reference elements in an embodiment.

Turning to FIG. 8, an example of how a computing device reevaluates reference elements in an embodiment is described. As with the previous example, it will be assumed that the processor 202 is carrying out the actions on the first computing device 100 and that the reference elements are formulas of a spreadsheet. Furthermore, the actions represented in FIG. 8 do not necessarily have to be carried out in the sequence shown and may, as appropriate, be carried out in parallel. At block 802, the processor 202 determines that a change has been made to a cell of the spreadsheet. For example, assume that the first computing device 100 hosts the spreadsheet 300 by executing the productivity software 101 on the processor 202, and that the second computing device 104 executes a web browser that interacts with the productivity software 101 to display the spreadsheet 300. Further assume that a user interacts with the second computing device 104 (via the graphical user interface 219) to change the value of cell B6 from '4' to '5,' which the processor 202 detects. The second computing device 104 transmits the changed value to the first computing device 100 via the network 102.

At block 804, the processor 202 searches the dependency graphs 222 and 224 to determine which formulas depend on the changed cell. In this example, the processor 202 determines, based on the search, that the formulas of cells B10, F4, and B8 reference cell B6. The processor 202 continues to search the dependency graphs 222 and 224 to identify the formulas that reference B10, F4, and B8, the formulas that reference those formulas, and so on, until the processor 202 completes its search (block 806). As a result, the processor 202 identifies the formula of the cells shown in FIG. 6B. However, the processor 202 does not need to determine the order in which to recalculate these formulas because the processor 202 already made this determination during the process set forth in conjunction with FIG. 7. That is, each of the formulas located by the processor 202 in carrying out blocks 804 and 806 have already been assigned to groups, and this group assignment is reflected in the data associated with the nodes of the dependency graphs 222 and 224 with which the respective formulas are associated.

At block 808, once the processor 202 has completed identifying a group of formulas (and, for example, moves on to identifying the next group), the processor 202 (in parallel with searching the dependency graphs 222 and 224) calculates the formulas of the group based on the new value in the changed cell. Because the formulas in a particular group do not depend on one another, the computing device 200 can calculate each of these formulas in parallel with one another. In one embodiment, for each formula calculation completed, the processor 202 stores the result in memory (e.g., cache memory) so that the formula or formulas of the next group that depend from the first formula can access the result. For example, the first processor core 202A recalculates the result of the formula of B 10 and stores the result in the first cache location 204A, while, in parallel, a second processor core 202B recalculates the result of the formula of F4 and stores the result in the third cache 204B, and the third processor core 202C recalculates the result of the formula of B8 and stores the result in the third cache 204C. Once recalculation of the formulas of Group 0 has been completed, any available processor core can access the appropriate result from the appropriate cache and begin recalculating the formulas of Group 1, and so on.

In an embodiment, the processor 202 caches the results of frequently-used operations in order to optimize the speed at which it recalculates the formulas of a spreadsheet. For example, assume that the processor 202 is executing a spreadsheet that has cells B1=SUM(A1:A100) and C1=SUM(A1:A100)+SUM(B1:B100). The processor 202 needs to calculate B1 before C1, but B1 and C1 do share a common operation: SUM(A1:A100). When the processor 202 calculates B1, it may cache the result in one of the cache locations of FIG. 2 When the processor 202 calculates C1, the processor 202 reuses the result of the B1 calculation (i.e., retrieves the result from the cache location) so that, in order to calculate (or recalculate) C1, the processor 202 only needs to calculate SUM(B1:B100).

According to various embodiments, a computing device can use one or more of the processes described above to calculate the degree of criticality or fragility of a reference element. For example, given a cell of a spreadsheet ("cell X"), criticality is a relative measure of the count of other cells whose values are in some way dependent on cell X. For example, a first cell is considered more critical than a second cell if the count of cells directly or indirectly dependent on the first cell is greater than the same count on the second cell. Conversely, given a cell ("cell Y"), fragility is a relative measure of the count of other cells upon which cell Y directly or indirectly depends. For example, a first cell is considered more fragile than a second cell if the count of cells upon which the first cell directly or indirectly depends is greater than the same count on the second cell. Dependents and dependencies may be due to a formula reference or some other mechanism that establishes a directional or bi-directional link between at least two cells.

For example, in the context of the computing device of FIG. 2, the processor 202 can, in an embodiment, determine which other cells depend on each cell by searching the first and second dependency graphs 222 and 224, count the number of dependents located for each search, and designate those cells whose number of dependents exceeds a predetermined threshold as critical. Put another way, the processor 202 takes a given cell and searches the dependency graphs 222 and 224 to find out which cell ranges are "interested" in that cell. The processor 202 obtains the list of ranges (e.g., a list of range objects, each range object including the spreadsheet location of each cell "interested" in that range). The processor 202 then searches the dependency graphs 222 and 224 again to determine which cells are interested in this first set of retrieved cells. The processor 202 carries out this search procedure recursively until either it fails to find any more dependents or begins finding cells that it had previously located (which may occur if there are cells in a circularly-dependent relationship).

The processor 202 may then highlight the cells designated to be critical on the graphical user interface 219 (e.g., in particular color, such as green). Alternatively, the processor 202 may rank the cells in order of criticality, and display a corresponding ranked list of the cells on the user interface 219.

In another example, the processor 202 can, in an embodiment, determine which other cells each cell depends on by analyzing the AST of the formula for each cell and searching the range tree 220. For example, the processor 202 takes each cell having a formula, finds out which cell ranges the formula depends on from the AST of the formula, and searches the range tree 220 to find the cells in those ranges that have formulas. The processor 202 then iterates over each of those cells, calculating the count of each cell's dependents by iteratively searching the range tree 220 for each successive set of formulas located. The processor 202 designates those cells whose number of dependencies on other cells exceeds a predetermined threshold as fragile. The processor 202 may then highlight the cells designated to be fragile on the graphical user interface 219 (e.g., in particular color, such as red). Alternatively, the processor 202 may rank the cells in order of fragility, and display a corresponding ranked list of the cells on the user interface 219.

Figure 9C:
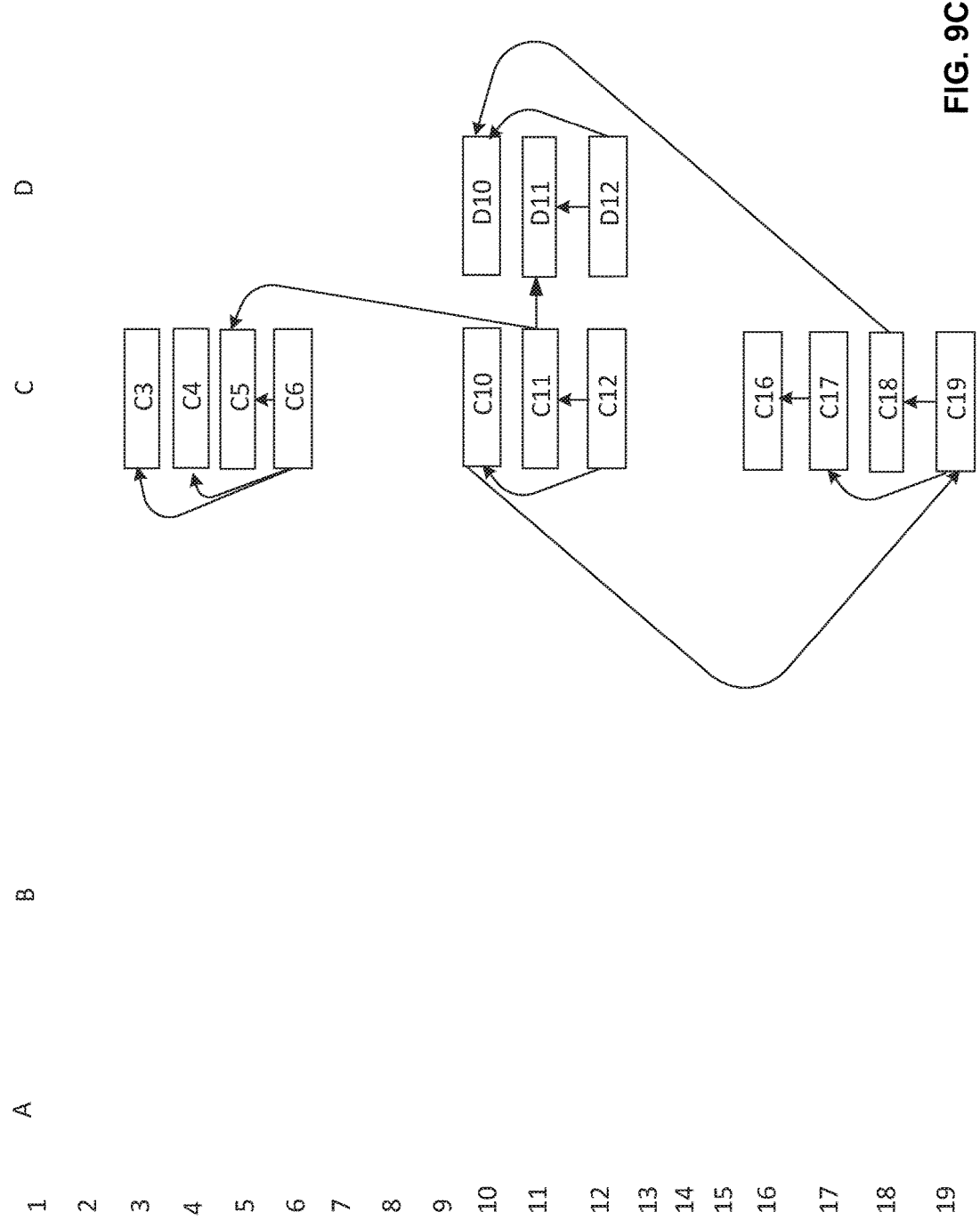

To illustrate one possible way in which the graphical user interface 219 may be implemented according to an embodiment, FIG. 9A shows an example of a spreadsheet. The spreadsheet 900 includes a number of interdependent cells either through a link (cells C10 and C18) or formulas. FIG. 9B shows the various formulas and links in their respective cells. If, for example, the spreadsheet 900 is being displayed by the processor 202, the processor 202 could carry out any of the procedures described above to maintain and identify dependencies and, in response to a user request (e.g., a pull-down menu selection of "Show Dependencies"), render, on the graphical user interface 219, the representation of FIG. 9C, in which the different cells having formulas or links are shown in their relative locations on the spreadsheet 900, but with the rest of the spreadsheet being hidden or shaded. Additionally, the processor 202 could show the various edges of a graph (along with directional arrows to indicate which element depends on which). In this example, assuming that criticality is measured by the number of formulas that depend, either directly or indirectly, from a cell, then cell D10 would be the most critical of the spreadsheet 900 (as it is depended upon by D12, C18, C19, C10, and C12). The processor 202 could highlight cell D10 in green to indicate this characteristic. On the other hand, assuming that fragility is measured by the number of cells that a cell depends on, either directly or indirectly, then cell C12 would be the most fragile of the spreadsheet 900 (as it depends on C11, D11, C10, C5, C19, C17, C18, C16, and D10). The processor 202 could highlight cell C12 in red to indicate this characteristic.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope.

What is claimed is:

1. A method for parallel processing a plurality of formulas of a table, the method, performed by a computing processor, comprising:
prior to an event requiring recalculation of the plurality of formulas, maintaining, in a computer memory, an interval-based dependency graph comprising a plurality of nodes, such that each node of the graph represents a range of cells of the table on which at least one of the plurality of formulas depends, and each of the plurality of formulas is associated with a node of the plurality of nodes representing the range of cells on which the formula depends;
assigning the plurality of formulas to a plurality of groups based on one or more searches of the dependency graph, such that no formula of any group is dependent upon any other formula of the group, and each formula of the plurality of formulas is assigned to only one group of the plurality of groups;
recalculating results for each group of formulas in sequence one group at a time, in parallel within each group, and on a separate thread of execution for each group;
displaying the results of the recalculation on a display device in communication with the computing device;
for each formula of the plurality of formulas, searching the dependency graph to determine how many other formulas depend either directly or indirectly therefrom;
in response to a user request, visually indicating on a user interface which of the plurality of formulas is the most critical based on the results of the dependency graph search; and
rendering one or more edges on the user interface to show which cells depend from the most critical formula.

2. The method of claim 1, wherein visually indicating comprises highlighting the cell having the most other formulas depending from it.

3. The method of claim 1, further comprising:
for the cell visually indicated to be the most critical, rendering one or more arrows on the user interface to show which other cells depend therefrom.

4. The method of claim 1, wherein the user request is in the form of a user interaction with a pull down menu.

5. A computing device that processes a plurality of formulas of a table in parallel, the computing device comprising a computing processor that carries out actions comprising:
prior to an event requiring recalculation of the plurality of formulas, maintaining, in a computer memory, an interval-based dependency graph comprising a plurality of nodes, such that each node of the graph represents a range of cells of the table on which at least one of the plurality of formulas depends, and each of the plurality of formulas is associated with a node of the plurality of nodes representing the range of cells on which the formula depends;
assigning the plurality of formulas to a plurality of groups based on one or more searches of the dependency graph, such that no formula of any group is dependent upon any other formula of the group, and each formula of the plurality of formulas is assigned to only one group of the plurality of groups;
recalculating results for each group of formulas in sequence one group at a time, in parallel within each group, and on a separate thread of execution for each group;
displaying the results of the recalculation on a display device in communication with the computing device;
for each formula of the plurality of formulas, searching the dependency graph to determine how many other formulas depend either directly or indirectly therefrom;
in response to a user request, visually indicating on a user interface which of the plurality of formulas is the most critical based on the results of the dependency graph search; and
rendering one or more arrows on the user interface to show which cells depend from the most critical formula.

6. The computing device of claim 5, wherein visually indicating comprises highlighting a cell containing the most critical formula.

7. The computing device of claim 5, wherein the computing processor performs further actions comprising:
for a cell containing the most critical formula, rendering one or more edges on the user interface to show which other cells depend therefrom.

8. The computing device of claim 5, wherein the user request is in the form of a user interaction with a pull down menu.

9. A method for parallel processing a plurality of formulas, each formula of the plurality of formulas being associated with a cell of a table that includes a plurality of cells, the method, performed by a computing processor, comprising:
prior to an event requiring recalculation of the table:
maintaining, in a computer memory, a range tree such that each node of the range tree is associated with the location of the cell within the table;
assigning each of the plurality of formulas to a group, such that no formula of any group is dependent upon any other formula of the group, and each formula is assigned to only one group;
receiving an input of a formula in the table;
analyzing the received formula to identify which of the plurality of cells the received formula depends upon;
searching the range tree to identify which of the depended-upon cells contain formulas;
based at least in part on the results of the range tree search assigning each cell of the plurality of cells to a group such that no cell of a group is dependent on another cell of a group, and each cell of the plurality is assigned to only one group;
in response to an event requiring the recalculation of one or more of the formulas of the plurality, recalculating results for the formulas sequentially by group according to the group to which their respective cells are assigned, in parallel within each group, and on a separate thread of execution for each group;
displaying the result of the recalculation on the table on a display device;
determining how many other formulas that each formula either directly or indirectly depends on by searching the range tree;
in response to a user request, visually indicating on a user interface which of the plurality of formulas is the most fragile based on the results of the range tree search; and
for a cell containing the most fragile formula, rendering one or more edges on the user interface to show which other cells the cell depends on.

10. The method of claim 9, wherein visually indicating comprises highlighting the cell containing the most fragile formula.

11. The method of claim 9, further comprising:
for the cell containing the most fragile formula, rendering one or more arrows on the user interface to show which other cells the cell depends on.

12. The method of claim 9, wherein the user request is in the form of a user interaction with a pull down menu.

* * * * *